(12) United States Patent
Hefeeda et al.

(10) Patent No.: US 9,418,297 B2
(45) Date of Patent: Aug. 16, 2016

(54) DETECTING VIDEO COPIES

(75) Inventors: Mohamed Hefeeda, Doha (QA); R. Cameron Harvey, Doha (QA)

(73) Assignee: QATAR FOUNDATION, Doha (QA)

(*) Notice: Subject to any disclaimer, the term of this patent is extended or adjusted under 35 U.S.C. 154(b) by 54 days.

(21) Appl. No.: 13/434,292

(22) Filed: Mar. 29, 2012

(65) Prior Publication Data

US 2013/0177252 A1 Jul. 11, 2013

(30) Foreign Application Priority Data

Jan. 10, 2012 (GB) .................................. 1200322.4

(51) Int. Cl.
*G06K 9/00* (2006.01)

(52) U.S. Cl.
CPC ........ *G06K 9/00758* (2013.01); *G06K 9/00744* (2013.01)

(58) Field of Classification Search
None
See application file for complete search history.

(56) References Cited

U.S. PATENT DOCUMENTS

| | | | |
|---|---|---|---|
| 6,757,442 B1* | 6/2004 | Avinash ........................ | 382/274 |
| 8,326,775 B2* | 12/2012 | Raichelgauz et al. .......... | 706/10 |
| 8,422,731 B2* | 4/2013 | Gupta et al. ................... | 382/100 |
| 2005/0154892 A1* | 7/2005 | Mihcak .................... | G06T 1/005 713/176 |
| 2006/0182368 A1 | 8/2006 | Kim | |
| 2006/0187358 A1* | 8/2006 | Lienhart ........... | G06F 17/30802 348/661 |
| 2007/0179921 A1* | 8/2007 | Zitnick et al. .................... | 706/20 |
| 2007/0201757 A1* | 8/2007 | Madej et al. ................... | 382/254 |
| 2007/0253594 A1* | 11/2007 | Lu et al. ......................... | 382/100 |
| 2009/0259633 A1* | 10/2009 | Bronstein et al. ................. | 707/3 |
| 2009/0290752 A1* | 11/2009 | Kalva ............................ | 382/100 |
| 2010/0049711 A1* | 2/2010 | Singh et al. ........................ | 707/6 |
| 2010/0318515 A1* | 12/2010 | Ramanathan ..... | G06F 17/30799 707/723 |
| 2010/0325117 A1* | 12/2010 | Sharma ......................... | 707/753 |
| 2012/0189212 A1* | 7/2012 | Ren et al. ...................... | 382/218 |

FOREIGN PATENT DOCUMENTS

| | | |
|---|---|---|
| EP | 1 494 135 A2 | 1/2005 |
| WO | 2007046012 A2 | 4/2007 |
| WO | 2007148264 A1 | 12/2007 |
| WO | 2010021965 A1 | 2/2010 |
| WO | 2010135623 A1 | 11/2010 |

OTHER PUBLICATIONS

Kim et al. "Spatiotemporal Sequence Matching for Efficient Video Copy Detection" IEEE, vol. 15, No. 1, Jan. 2005.*

(Continued)

*Primary Examiner* — Bhavesh Mehta
*Assistant Examiner* — Oneal R Mistry
(74) *Attorney, Agent, or Firm* — Mossman Kumar & Tyler PC

(57) ABSTRACT

A computer-implemented method for detecting a copy of a reference video, comprises segmenting respective ones of multiple frames of the reference video into multiple regions, determining sets of image features appearing in respective ones of the multiple frames, determining a measure for the relative number of image features for a given region across the multiple frames, generating a spatio-temporal signature for the reference video using the determined measures, and comparing the signature for the reference video against a spatio-temporal signature of a query video to determine a likelihood of a match.

16 Claims, 4 Drawing Sheets

(56) References Cited

OTHER PUBLICATIONS

Mohan, R., "Video Sequence Matching," Acoustics, Speech and Signal Processing, IEEE Int'l Conference, Seattle, WA, vol. 6, pp. 3697-3699, May 12-15, 1998.

Kim, C., et al, "Spatiotemporal Sequence Matching for Efficient Video Copy Detection," vol. 15, No. 1, Jan. 1, 2005.

Usman, Muhammad et al., "Real Time Video Copy Detection Under the Environments of Video Degradation and Editing," Advanced Communication Technology, IEEE 10th Int'l Conference, Piscataway, NJ, Feb. 17, 2008.

Khodabakhshi, N. et al., Copy Detection of 3D Videos, MMSys'12, Chapel Hill, NC, pp. 131-142, Feb. 22-24, 2012.

Examination Report in GB1200322.4, dated May 4, 2012.

ISR and Written Opinion in PCT/EP2012/060057, dated Oct. 2, 2012.

* cited by examiner

DETECTING VIDEO COPIES

CROSS REFERENCE TO RELATED APPLICATIONS

This application claims foreign priority from UK Patent Application Serial No. 1200322.4, filed 10 Jan. 2012.

BACKGROUND

Devices with digital video recording capability are readily available and easily affordable. In fact, multimedia technologies have advanced to the point where video recording capabilities are commonly included as part of electronic devices such as digital cameras, cell phones and personal digital assistants for example. Alongside the popularity and ease of capturing video content, there are now many options for sharing and consuming captured content. For example, it is straightforward to distribute video content from a computer onto social media websites for example, and more and more people are uploading and sharing video content in this and similar ways.

This situation creates issues relating to data management, such as database optimization for example. It is inefficient to store multiple copies of the same video in a database as it creates needless infrastructure expenses and complicates search and retrieval algorithms. Another issue relates to copyright infringement. There are ways to copy commercial content and redistribute it over the Internet for example. This can result in loss of revenue for a business, and it is typically not feasible to manually sift through hours of videos to determine if an illegal copy has been made or distributed.

SUMMARY

Detecting whether a video already exists in a database can allow more effective use of storage. In addition, automated video copy detection techniques can be used to detect copyright violations as well as to monitor usage. According to an example, there is provided a content-based video copy detection method, which generates signatures that capture spatial and temporal features of videos. Typically, a computed signature is compact, and can be created from individual video frames. For example, each video frame can be divided into multiple regions and discriminating or salient visual features for each region can be determined. In an example, a count of the visual features in each region can be used as a spatial signature. To determine a spatial signature, the number of counts in each region can be sorted along a time line and an ordinal value assigned based on its temporal rank for example. Temporal and spatial signatures can be combined, and the resultant signature can be compared against signatures of different videos.

According to an example, there is provided a computer-implemented method for detecting a copy of a reference video, comprising segmenting respective ones of multiple frames of the reference video into multiple regions, determining sets of image features appearing in respective ones of the regions, determining a measure for the relative number of image features for a given region across the multiple frames, generating a spatio-temporal signature for the reference video using the determined measures, and comparing the signature for the reference video against a spatio-temporal signature of a query video to determine a likelihood of a match. A set of static pixels for the multiple frames with an intensity variance below a predetermined threshold intensity value is determined and disregard or otherwise excluded or ignored from further processing. Such static pixels can relate to objects in a video which have been inserted such as text and borders and the like. In an example, segmenting includes specifying a number of horizontal and vertical partitions to define a number of regions for the multiple frames. A set of static pixels for the multiple frames can be determined with a colour variance below a predetermined threshold value, and disregarded as above.

In an example, determining sets of image features can include using a scale- and rotation-invariant interest point detection method to determine an interest point in a region of a frame having a plurality of pixels, the interest point having a location in the region and an orientation. A spatial element of the spatio-temporal signature can represent the number of interest points for regions of the multiple frames, and a temporal element can represent the number of interest points for regions of the multiple frames after the number is sorted in each region along a time line of the multiple frames. The spatio-temporal signature can include spatial information from segmenting the frames into regions and temporal information from ranking each region along a time line for the multiple frames. In an example, comparing the signature includes generating a spatio-temporal signature for the query video, and computing the distance between the spatio-temporal signature for the reference video and the spatio-temporal signature for the query video.

According to an example, there is provided apparatus for extracting a spatio-temporal signature from video data to detect a copy, comprising a segmentation module to segment respective ones of multiple frames of a reference video into multiple regions, a feature extraction engine to generate feature data representing sets of image features appearing in respective ones of the regions, a signature generation module to determine a measure for the relative number of image features for a given region across the multiple frames and to generate a spatio-temporal signature for the reference video using the determined measures, and a comparison engine to compare the signature for the reference video against a spatio-temporal signature of a query video to determine a likelihood of a match.

In an example, the comparison engine can generate a measure representing the similarity of the query video to the reference video. A reference video signature database to store the signature for the reference video can be provided. A static pixel identification engine to determine a set of static pixels for the multiple frames with an intensity or colour variance below a predetermined threshold value can be provided. In an example, the segmentation module can receive partition data representing a number of horizontal and vertical partitions to define a number of regions for the multiple frames. The feature extraction engine can determine sets of image features using a scale- and rotation-invariant interest point detection system configured to determine an interest point in a region of a frame having a plurality of pixels, the interest point having a location in the region and an orientation.

According to an example, there is provided a computer program embedded on a non-transitory tangible computer readable storage medium, the computer program including machine readable instructions that, when executed by a processor, implement a method for detecting a copy of a reference video, comprising segmenting respective ones of multiple frames of the reference video into multiple regions, determining sets of image features appearing in respective ones of the regions, determining a measure for the relative number of image features for a given region across the multiple frames, generating a spatio-temporal signature for the reference video using the determined measures, and comparing the signature for the reference video against a spatio-temporal signature of a query video to determine a likelihood of a match.

BRIEF DESCRIPTION OF THE DRAWINGS

An embodiment of the invention will now be described, by way of example only, and with reference to the accompanying drawings, in which.

DETAILED DESCRIPTION

Figure 1:
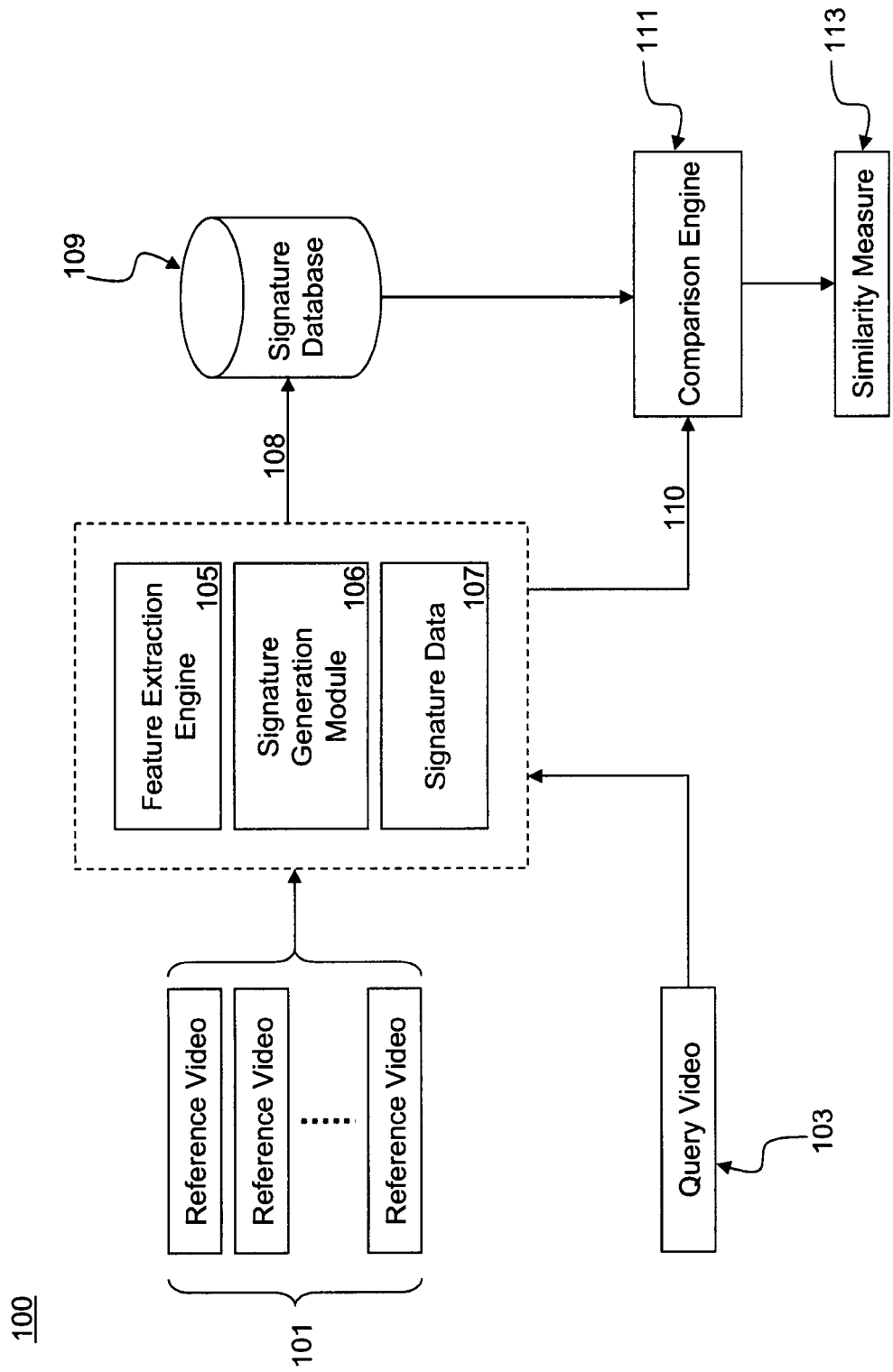
FIG. 1 is a schematic block diagram of a basic architecture for video copy detection system according to an example.

FIG. 1 is a schematic block diagram of a system for video copy detection according to an example. A reference video 101 is an original video. A query video 103 is a video that is a candidate copy of a reference video 101. In an example, a feature extraction engine 105 is used to determine features for reference and query videos by generating feature data representing sets of image features appearing in respective ones of regions of frames for the videos. A signature generation module 106 determines a measure for the relative number of image features for a given region across the multiple frames and generates signature data 107 representing a spatio-temporal signature for the reference and query videos using the determined measures. The signature 108 for the reference video 101 is stored in a signature database 109. A signature 110 for a query video 103 is compared with a signature 108 using a comparison engine 111, and a similarity measure 113 is generated which provides a measure representing the degree to which the query video and reference video are the same. In an example, signatures 108, 110 are combined signatures that capture spatial and temporal features of videos 101, 103.

Figure 2:
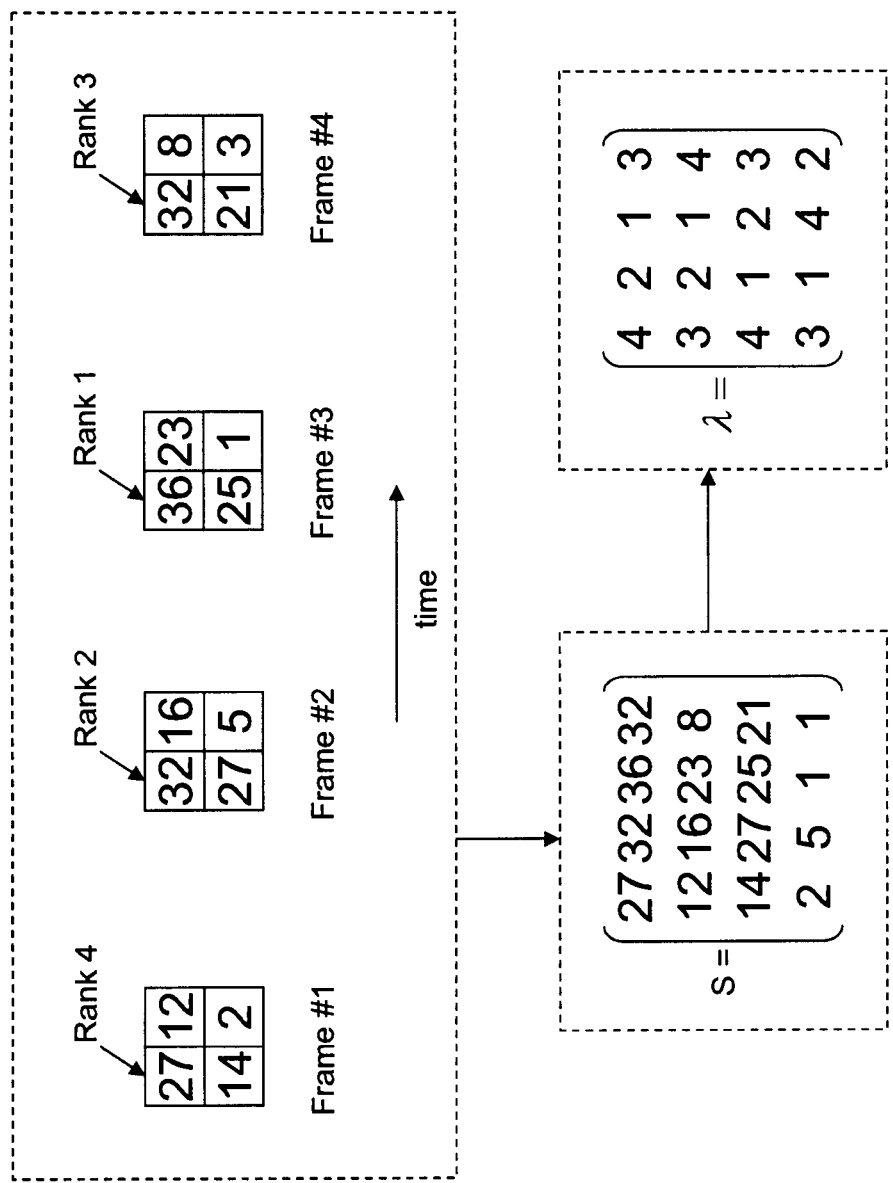
FIG. 2 is schematic diagram of four frames of a video, such as a reference or query video according to an example.

In an example, the spatial part of a signature for a video is generated by dividing multiple video frames into regions. Local features are detected and counted in each region. These feature counts in the regions of a frame represent the spatial part of the signature for that frame. FIG. 2 is schematic diagram of four frames of a video, such as a reference or query video. In the example of FIG. 2, each frame (frames #1-4) have each been segmented or partitioned into four regions. That is, each frame has been partitioned using one vertical and one horizontal partition resulting in four regions per frame. The same partitioning is used across the frames to maintain symmetry between the regions for the frames. For each frame, the number of features within a region is determined. Any suitable technique to determine features of an image can be used. In an example, a speeded-up robust feature detection method is used to determine features. Typically, such a method is a scale- and rotation-invariant interest point detector which uses integral images for image convolutions. In an example, the number of detected features for a region can be stored in storage device as will be described below.

With reference to FIG. 2, the number of detected features for regions of the frames 1-4 can be seen. For respective regions across the frames, the number of features can be used to provide a ranking such that the higher the number of detected features for that region the higher the ranking. For example, considering the upper left region for the frames in FIG. 2, it can be seen that this region in frame #1 would be ranked 4 as it has the lowest number of detected features of all upper left regions (i.e. similar or corresponding regions) across the frames. Similarly, the corresponding region in frame #3 is ranked 1 for example.

The matrix S shows the spatial part of the signature. That is, feature counts from regions of the multiple frames are transferred into a matrix S. Rows represent the feature counts for a region across frames. Accordingly, a column represents feature counts for a frame. In order to add temporal information to the signature, the number of counts in each region is sorted along the time line of the frames, and assigned an ordinal value based on its temporal rank. In the example of FIG. 2, each row of the matrix λ shows the temporal part of the signature for one region. The element $\lambda_{i,j}$ represents the rank (or order) of region i in frame j. For example, region 1 in frame 1 has the smallest number of features in across all four frames, and thus has a rank of 4 in the λ matrix.

Therefore, according to an example the final combined signature of a video clip (matrix λ) includes two parts: spatial information generated from partitioning frames into regions, and temporal information generated by ranking each region along the time-line of the frames. In order to detect copies signatures can be compared using any similarity metric. In an example, an L1 (1-norm) distance is used in order to determine the similarity between videos.

Figure 3:
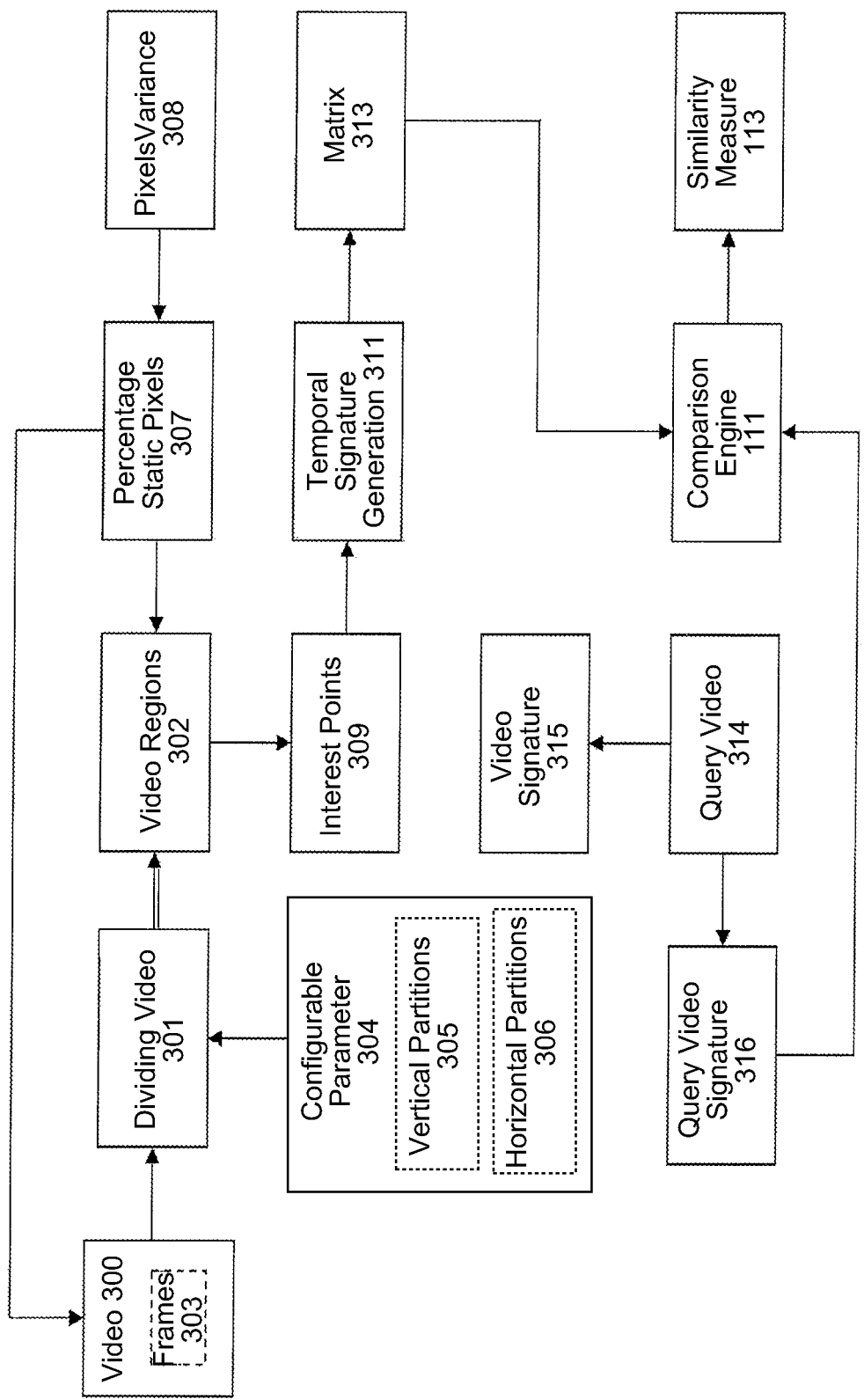
FIG. 3 is a schematic block diagram of a method according to an example.

FIG. 3 is a schematic block diagram of a method according to an example. In block 301 a video 300 is divided into regions 302. More specifically, frames 303 of a portion of a video 300, which can be a reference or query video as described above, are segmented into regions 302. The number of regions 302 is a configurable parameter 304, which can be set by specifying a number of vertical 305 and horizontal 306 partitions for the frames of the video 300. For example, specifying 3 horizontal and 2 vertical partitions would divide respective frames into a grid with 3 rows and 2 columns for a total of 6 regions.

In block 307 the percentage of static pixels in each region is calculated. The presence of static pixels within the cropped image can indicate the presence of an image, some text, a logo, or a background pattern superimposed onto the video. If a significant number of pixels within a region are masked then too much of the area may be occluded to obtain useful information. If this is the case, the region in question can be turned off or disregarded, and the process can proceed based on the remaining regions.

That is, according to an example, objects such as static borders, letter-box and pillar-box effects for example can be removed or otherwise disregarded. This can form a pre-processing step which is performed by determining how pixels change throughout the video clip under consideration. In an example, pixels with a variance 308 below a threshold value are likely to be edit effects which have been added to the video. These effects can include borders, logos and pattern insertions as well as letter-box and pillar-box effects from resizing. The variance can be calculated on each pixel as follows: a gray-scale value of pixel x in frame i is denoted $x_i$. Two quantities, $M_k$ and $Q_k$ are defined as follows:

a. $M_k = \begin{cases} x_1, & k = 1 \\ M_{k-1} + \dfrac{x_k - M_k - 1}{k}, & k = 2, \ldots, n \end{cases}$ $Q_k = \begin{cases} 0, & k = 1 \\ Q_{k-1} + \dfrac{(k-1)(x_k - M_k - 1)^2}{k}, & k = 2, \ldots, n \end{cases}$ For the $n^{th}$ frame, and once $Q_n$ is calculated the variance is $\dfrac{Q_n}{n}.$ If all pixels in a row (or column) on the outside border of a frame have a variance below the predetermined threshold value, they are removed or otherwise disregarded from the image. The process is repeated until a row (or column) is encountered where at least one pixel shows variance above the threshold. The result is an image which is cropped of borders in which the pixels do not vary. The sub-image corresponding to the size of the cropped mask can be used for further processing. This will remove any pillar-box effects, letter-box effects, and borders from cropping or shifting. In an example, the step of determining static pixels can be performed before or after a frame is segmented.

In block 309 the number of interest points in each region are determined. That is, the features for the frame are extracted, and a count for a region is incremented if an interest point resides in the region. As described above with reference to FIG. 2, the count of interest points in regions of frames for the video clip defines a spatial signature for the clip. In block 311 the temporal signature is generated. The temporal aspect of the signature is obtained by sorting the feature counts in each region along the time-line for the frames (denoted by the time axis in FIG. 2). In an example, the frame with the most interest points is assigned an ordinal value of 1. The frame with the next highest number of interest points is assigned a value of 2, and so on. The result is a matrix (for example) 313 where each row contains the ranking vector of a particular region. The result in block 313 corresponds to the spatio-temporal signature for the video, such as a reference video for example.

More formally, for a video consisting of M frames and L regions, each region $t_i$ would result in an M-dimension vector, $s_i = (f_{i,1}, f_{i,2}, \ldots, f_{i,M})$, where $f_{i,k}$ is the number of features counted in region i of frame k. The matrix $S_i = (S_1, S_2, \ldots, S_L)$ is used to produce the ranking matrix, $\lambda = (\lambda_1, \lambda_2, \ldots, \lambda_L)$. Each $\lambda_i = (r_1^i, r_2^i, \ldots, r_L^i)$ where $r_k^i$ is the rank of the $i^{th}$ region of frame k.

For a video with M frames and L regions, the signature for the video consists of an L×M matrix. In order to calculate the distance between two signatures for a reference video and a query video, the L1 distance between them is used in an example. If the number of frames in the reference video is N and the number of frames in the query video is M, where N≥M, each video is divided into L regions. A sliding window approach can then used where the distance between the query video and the first M frames of the reference video is calculated. The window of M frames is then slid over one frame and the distance between the query video and M frames in the reference video starting at the second frame is determined. The minimum distance and the frame offset, p, for which this occurred is recorded as sliding proceeds. At the end of the reference video, the best match occurs at the minimum distance.

If $\lambda_i$ is the ranking vector of the $i^{th}$ region, the distance between a query video $V_q$ and a reference video $V_r$ is calculated in an example as:

i. $D(V_q, V_r) = p \, \mathrm{argmin}(D(V_q, V_r^p))$ where p is the frame offset in the reference video which achieved this minimum and represents the location of the best match between the query video and the reference video, and $D(V_q, V_r^p)$ is given by:

a. $D(V_q, V_r^p) = \frac{1}{L} \sum_{i=1}^{L} d^p(\lambda_q^i, \lambda_r^i)$, where b. $d^p(\lambda_q^i, \lambda_r^i) = \frac{1}{C(M)} \sum_{j=1}^{M} |\lambda_q^k(j) - \lambda_r^j(k)(p+j)|$.

Here, C(M) is a normalizing factor which is a function of the size of the query. It represents the maximum possible distance between the reference video and the query video. This maximum distance occurs when the ranking of the reference video is exactly opposite to that of the query. There are two cases based on whether M is even or odd. In the case when M is even, it is twice the sum of the first $$\frac{M}{2}$$

odd integers. Similarly, when M is odd, C(M) is twice the sum of the first $$\frac{M-1}{2}$$

even integers. Each of these sequences can be computed directly as follows:

a. $C(M) = \left\{ \left(\frac{M}{2}\right)^2, M \text{ even} \right.$ b. $\left(\left\lfloor\frac{M}{2}\right\rfloor\right)\left(\left\lfloor\frac{M}{2}\right\rfloor + 1\right)$, M odd In block 315 a query video 314 whose signature 316 has been determined as described above can be processed using comparison engine 111 in order to determine if it is a copy of the reference video. If the minimum distance between the signature 316 of the query video 314 and that of the reference video at offset p is below a threshold, then it is likely that the query video 314 is a copy of the reference video. In this case, an output such as similarity measure 113 can be provided indicating that a copy has been located starting in frame p of the reference video.

Accordingly, a method of an example proceeds by determining the distance between the set of frames from a query video and the first M frames in a reference video. It then shifts the comparison window and finds the distance between the query set and the reference set starting at the second frame of the reference set. This continues for a total of N−M+1 calculations. For every calculation, the M frames in the query are compared with M frames of the reference video for a total of N−M+1)M comparisons.

Figure 4:
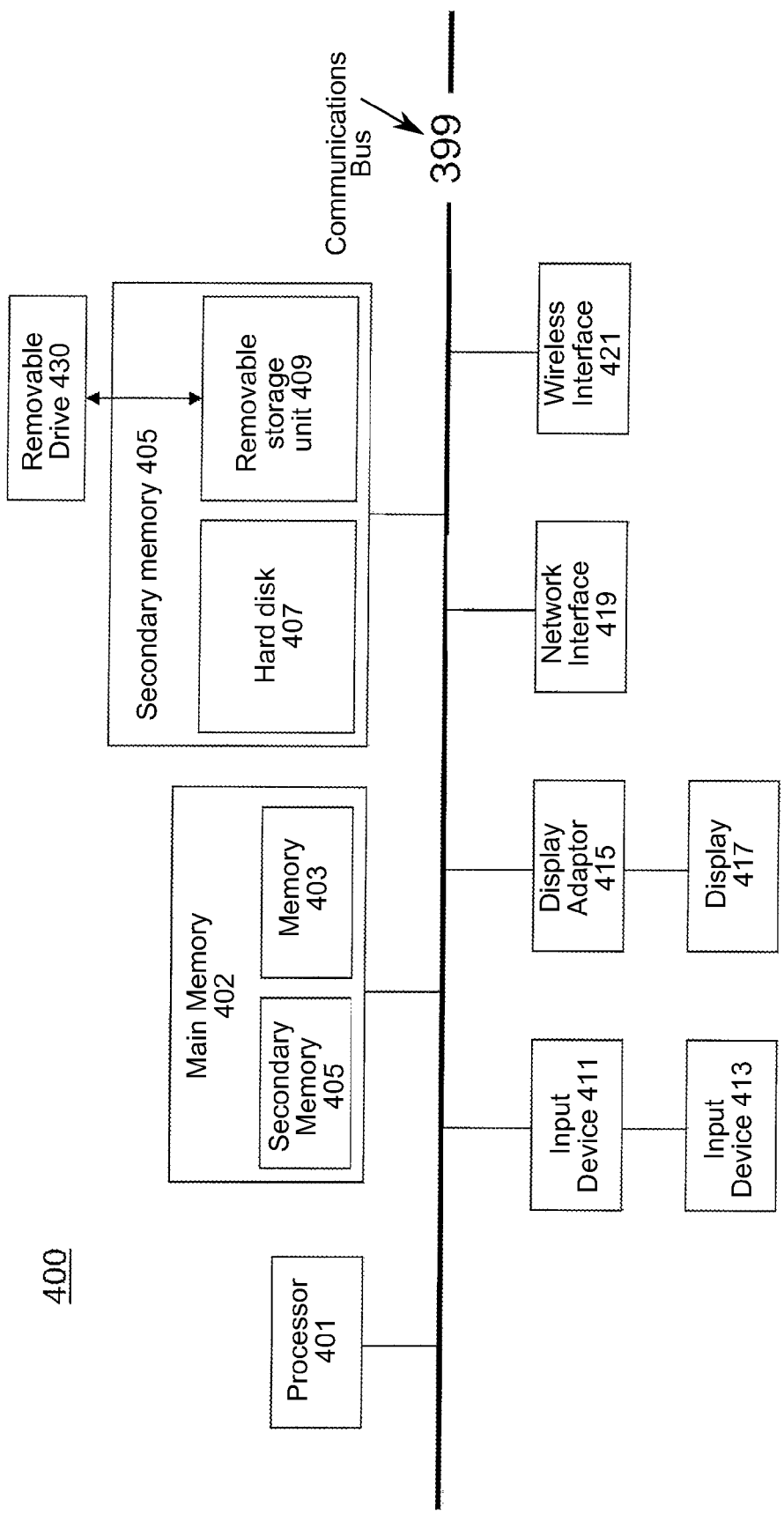
FIG. 4 is a schematic block diagram of an apparatus according to an example.

FIG. 4 is a schematic block diagram of an apparatus according to an example suitable for implementing any of the systems, methods or processes described above. Apparatus 400 includes one or more processors, such as processor 401, providing an execution platform for executing machine readable instructions such as software. Commands and data from the processor 401 are communicated over a communication bus 399. The system 400 also includes a main memory 402, such as a Random Access Memory (RAM), where machine readable instructions may reside during runtime, and a secondary memory 405. The secondary memory 405 includes, for example, a hard disk drive 407 and/or a removable storage drive 430, representing a floppy diskette drive, a magnetic tape drive, a compact disk drive, etc., or a nonvolatile memory where a copy of the machine readable instructions or software may be stored. The secondary memory 405 may also include ROM (read only memory), EPROM (erasable, programmable ROM), EEPROM (electrically erasable, programmable ROM). In addition to software, data representing any one or more of a reference video 101, query video 103 or portions thereof including multiple frames for example, signature data 107 and similarity measures 113 may be stored in the main memory 402 and/or the secondary memory 405. The removable storage drive 430 reads from and/or writes to a removable storage unit 409 in a well-known manner.

A user can interface with the system 400 with one or more input devices 411, such as a keyboard, a mouse, a stylus, and the like in order to provide user input data. The display adaptor 415 interfaces with the communication bus 399 and the display 417 and receives display data from the processor 401 and converts the display data into display commands for the display 417. A network interface 419 is provided for communicating with other systems and devices via a network (not shown). The system can include a wireless interface 421 for communicating with wireless devices in the wireless community.

It will be apparent to one of ordinary skill in the art that one or more of the components of the system 400 may not be included and/or other components may be added as is known in the art. The apparatus 400 shown in FIG. 4 is provided as an example of a possible platform that may be used, and other types of platforms may be used as is known in the art. One or more of the steps described above may be implemented as instructions embedded on a computer readable medium and executed on the system 400. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

According to an example, a feature extraction engine 105, signature generation module 106 and comparison engine 111 can reside in memory 402 and operate on data representing a reference video 101 or query video 103 to provide signature data 107 for comparison and for storage in database 109 for example. A database 109 can be provided on a HDD such as 405, or can be provided as a removable storage unit 409 for example. The database 109 can be remote from the apparatus 400 and can be connected thereto via the network interface for example.

What is claimed is:

1. A computer-implemented method for detecting a copy of a reference video, comprising:
   segmenting respective ones of multiple frames of the reference video into multiple regions;
   determining a number of image features appearing in each of multiple regions in respective ones of the multiple frames by processing each frame of the respective ones independently of the other frames of the respective ones, wherein the image features include interest points each having a location in a corresponding region and an orientation;
   determining a measure for the number of image features for a given region in each frame across the multiple frames;
   assigning an ordinal value to each region across the respective ones of the multiple frames using the number of image features appearing in the each respective region of the ones of the multiple frames;
   ordering the ordinal values for respective ones of multiple frames along the time-line of the multiple frames;
   generating a spatio-temporal signature matrix for the reference video using the ordered ordinal values including defining a ranking vector for each region comprising the ordinal values corresponding to the region and sorted along the time-line of the region within the multiple frames; and
   comparing the spatio-temporal signature matrix for the reference video against a spatio-temporal signature matrix of a query video to determine a likelihood of a match including:
   a) estimating a distance between the ranking vectors defined for the reference video and ranking vectors defined for the query video using a normalizing factor representing a maximum distance between the reference video and the query video, and
   (b) determining the likelihood of the match between the reference video and the query video using the distance between the ranking vectors for the reference video and the query video.

2. A computer-implemented method as claimed in claim 1, further comprising:
   determining a set of static pixels for the multiple frames with an intensity variance below a predetermined threshold intensity value; and
   disregarding the static pixels.

3. A computer-implemented method as claimed in claim 1, wherein segmenting includes specifying a number of horizontal and vertical partitions to define a number of regions for the multiple frames.

4. A computer-implemented method as claimed in claim 1, further comprising:
   determining a set of static pixels for the multiple frames with a colour variance below a predetermined threshold value; and
   disregarding the static pixels.

5. A computer-implemented method as claimed in claim 1, wherein determining the number of image features includes using a scale- and rotation-invariant interest point detection method to determine at least one interest point in each region of each frame of the multiple frames, wherein each region includes a plurality of pixels.

6. A computer-implemented method as claimed in claim 1, wherein a spatial element of the spatio-temporal signature represents the number of interest points for regions of the multiple frames, and a temporal element represents the number of interest points for regions of the multiple frames after the number is sorted in each region along a time line of the multiple frames.

7. A computer-implemented method as claimed in claim 1, wherein the spatio-temporal signature includes spatial information from segmenting the frames into regions and temporal information from ranking each region along a time line for the multiple frames.

8. A computer-implemented method as claimed in claim 1, wherein comparing the signature includes:

generating a spatio-temporal signature matrix for the query video; and computing the distance between the spatio-temporal signature matrix for the reference video and the spatio-temporal signature matrix for the query video.

9. A computer-implemented method as claimed in claim 1, further comprising:
wherein determining the number of image features appearing in the multiple regions in respective ones of the multiple frames includes detecting interest points appearing in each region of the multiple frames;
wherein determining the measure for the number of image features for the given region in each frame across the multiple frames includes counting the number of interest points appearing in the given region for each region of the multiple frames.

10. Apparatus for extracting a spatio-temporal signature from video data to detect a copy, comprising:
a segmentation module to segment respective ones of multiple frames of a reference video into multiple regions;
a feature extraction engine to generate feature data representing a number of image features appearing in each of multiple regions in respective ones of the multiple frames by processing each frame of the respective ones independently of the other frames of the respective ones, wherein the image features include interest points each having a location in a corresponding region and an orientation;
a signature generation module to:
determine a measure for the number of image features for a given region in each frame across the multiple frames,
assign an ordinal value to each region across the respective ones of the multiple frames using the number of image features appearing in the each respective region of the ones of the multiple frames, and
generate a spatio-temporal signature matrix for the reference video using the ordered ordinal values along the time-line of the multiple frames including defining a ranking vector for each region comprising the ordinal values corresponding to the region and sorted along the time-line of the region within the multiple frames; and
a comparison engine to compare the spatio-temporal signature matrix for the reference video against a spatio-temporal signature matrix of a query video to determine a likelihood of a match including:
(a) estimating a distance between the ranking vectors defined for the reference video and ranking vectors defined for the query video using a normalizing factor representing a maximum distance between the reference video and the query video, and
(b) determining the likelihood of the match between the reference video and the query video using the distance between the ranking vectors for the reference video and the query video.

11. Apparatus as claimed in claim 10, the comparison engine further to generate a measure representing the similarity of the query video to the reference video.

12. Apparatus as claimed in claim 10, further comprising: a reference video signature database to store the signature for the reference video.

13. Apparatus as claimed in claim 10, further comprising a static pixel identification engine to determine a set of static pixels for the multiple frames with an intensity or colour variance below a predetermined threshold value.

14. Apparatus as claimed in claim 10, the segmentation module to receive partition data representing a number of horizontal and vertical partitions to define a number of regions for the multiple frames.

15. Apparatus as claimed in claim 10, wherein the feature extraction engine to determine the number of image features uses a scale- and rotation-invariant interest point detection system configured to determine at least one interest point in each region of each frame of the multiple frames, wherein each region includes a plurality of pixels, and wherein each interest point includes a location in the region and an orientation.

16. A computer program embedded on a non-transitory tangible computer readable storage medium, the computer program including machine readable instructions that, when executed by a processor, implement a method for detecting a copy of a reference video, comprising:
segmenting respective ones of multiple frames of the reference video into multiple regions;
determining a number of image features appearing in each of multiple regions in respective ones of the multiple frames by processing each frame of the respective ones independently of the other frames of the respective ones, wherein the image features include interest points each having a location in a corresponding region and an orientation;
determining a measure for the number of image features for a given region in each frame across the multiple frames;
assigning an ordinal value to each region across the respective ones of the multiple frames using the number of image features appearing in the each respective region of the ones of the multiple frames;
ordering the ordinal values for respective ones of multiple frames along the time-line of the multiple frames;
generating a spatio-temporal signature matrix for the reference video using the ordered ordinal values including defining a ranking vector for each region comprising the ordinal values corresponding to the region and sorted along the time-line of the region within the multiple frames; and
comparing the spatio-temporal signature matrix for the reference video against a spatio-temporal signature matrix of a query video to determine a likelihood of a match including:
(a) estimating a distance between the ranking vectors defined for the reference video and ranking vectors defined for the query video using a normalizing factor representing a maximum distance between the reference video and the query video, and
(b) determining the likelihood of the match between the reference video and the query video using the distance between the ranking vectors for the reference video and the query video.

* * * * *